United States Patent

[11] 3,618,727

| [72] | Inventor | John P. Cornet |
| | | Indianapolis, Ind. |
| [21] | Appl. No. | 11,704 |
| [22] | Filed | Feb. 16, 1970 |
| [45] | Patented | Nov. 9, 1971 |
| [73] | Assignee | General Motors Corporation |
| | | Detroit, Mich. |

[54] OVERLAP VALVE
2 Claims, 1 Drawing Fig.
[52] U.S. Cl............................................. 192/87.13,
192/87.19, 192/87.15, 192/109 F, 91/412
[51] Int. Cl...................................................... F16d 25/10
[50] Field of Search.................................... 192/3.26,
3.27, 87.13, 87.18, 87.19

[56] References Cited
UNITED STATES PATENTS

| 2,929,478 | 3/1960 | Tuck et al................... | 192/87.13 X |
| 2,933,172 | 4/1960 | Fisher et al................. | 192/87.13 |
| 3,359,832 | 12/1967 | Schjolin et al............. | 192/3.26 X |

*Primary Examiner*—Benjamin W. Wyche
*Attorneys*—W. E. Finken, A. M. Heiter and D. F. Scherer

ABSTRACT: A transmission control system for controlling the engagement and disengagement of a pair of friction drive establishing devices. The control has an overlap control valve having differential area lands and differential area ends for maintaining pressure in the friction device to be disengaged until sufficient pressure is present in the friction device to be engaged to permit torque reaction of the engaging device to maintain continuity of drive during the shift period.

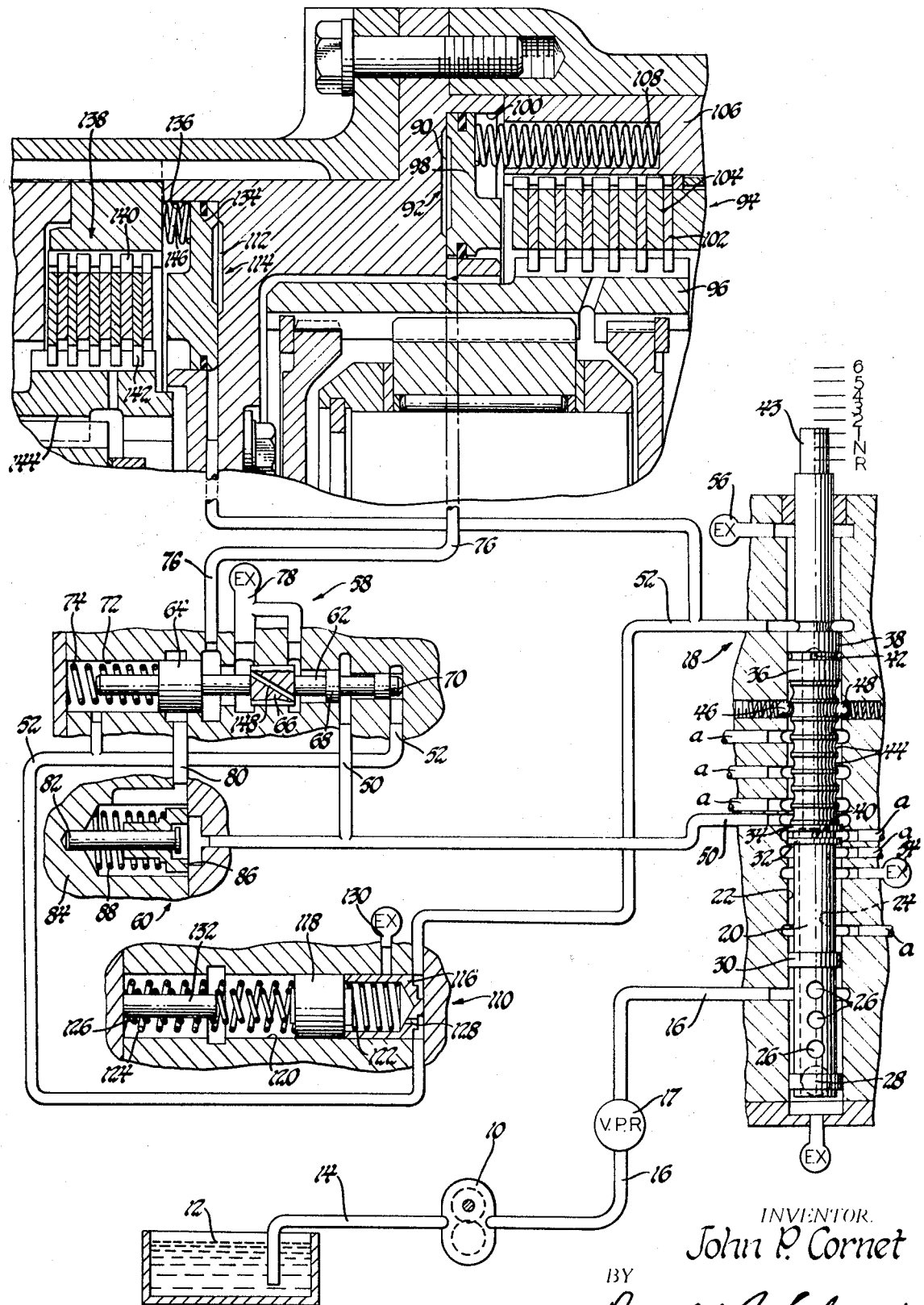

OVERLAP VALVE

This invention relates to transmission controls and more particularly to a control system for controlling the overlap between a pair of friction drive establishing devices.

The present invention includes a manual valve for selectively engaging clutches and brakes in a transmission such as that disclosed in U.S. Pat. No. 3,267,769 issued to Tuck et al., Aug. 23, 1966, an overlap control valve for controlling the disengagement of one friction device in response to engagement of another friction device, and a trimmer valve for controlling the pressure rise in the last-mentioned friction device. The overlap control valve has two differential area portions connected in series between the manual valve and one of the friction devices. One of the differential area portions is selectively connected and disconnected from an exhaust port by a valve land such that when the overlap valve is in one position the one differential area is exhausted and in another position the one differential area is pressurized by fluid directed from the manual valve through a check valve to a fluid motor of a friction device. The check valve maintains pressure on the differential area and in the fluid motor when the manual valve is moved from one drive ratio position to another. The other differential area of the overlap valve is pressurized by fluid directed through the manual valve in one position to cause the overlap valve to move against the biasing spring so that the fluid motor can be pressurized. The last mentioned differential area is exhausted through the manual valve when the manual valve is shifted from the one drive ratio to another.

The opposing unequal diameter ends of the overlap control valve are connected in parallel with the manual control valve and a second fluid motor such that when the second fluid motor is pressurized the opposing ends of the overlap valve are subjected to the fluid pressure in the second fluid motor. The fluid pressure rise in the second fluid motor is controlled by a trimmer valve so that during the initial portion of a shift from one drive ratio to another the fluid pressure acting on the one differential area maintains the overlap valve in its shifted position. However, as the fluid pressure in the second motor increases, the fluid pressure acting on the differential area of the ends of the overlap valve will increase to overcome the pressure bias on the differential area of the lands thereby moving the overlap valve to the spring set or unshifted position. The fluid pressure in the second motor will not return the overlap valve to the spring set position until the second motor is sufficiently pressurized to establish a drive ratio in the transmission. Thus the first friction motor remains pressurized until the second friction motor is capable of establishing a drive ratio so that there is no interruption in power transmission between the input and output shafts during the shift period.

It is therefore an object of this invention to provide in an improved transmission control a single valve member for maintaining one friction drive engaged until a second friction drive is sufficiently established to prevent power interruption during shifting.

Another object of this invention is to provide in a transmission control an overlap valve having a pair of differential areas responsive to fluid pressure for shifting the overlap valve to permit actuation of one fluid motor for one drive ratio and having another portion responsive to fluid pressure in a second fluid motor, for another drive ratio, to return the overlap valve to the spring set position after completion of a drive ratio change.

These and other objects and advantages of the present invention will be apparent from the following description and drawing which is a diagrammatic view of a portion of a transmission and control.

Referring to the drawing, there is shown a control system having a pump 10 which draws fluid from a reservoir 12 through an inlet passage 14 and delivers fluid trough a main passage 16 to the control system. A fluid pressure in passage 16 is established by a conventional pressure regulator valve 17. The passage 16 is in fluid communication with a manual selector valve 18 which has a valve spool 20 slidably disposed in a valve bore 22. The valve spool 20 has a central passage 24 in fluid communication with passage 16 through a plurality of openings 26 between a pair of lands 28 and 30. The valve spool 20 has six equal diameter lands 28, 30, 32, 34, 36 and 38 spaced along its length. The recessed portion between lands 30 and 32 and between lands 36 and 38 are connected to central passage 24 through openings 40 and 42 respectively. The end 43 of valve spool 20 is adapted to be connected to an operator linkage not shown to permit the valve spool 20 to be moved in the bore 22 to select a plurality of drive positions. A plurality of grooves 44 are disposed between lands 34 and 36 which grooves 44 cooperate with a pair of detent members 46 and 48 to maintain the valve spool 20 in the position selected by the operator. The bore 22 is in fluid communication with a first apply passage 50, a second apply passage 52, a pair of exhaust ports 54 and 56, and a plurality of other passages designated *l*. The passages designated *a* are adapted to be connected to other members of the transmission and control not shown in this application such as the clutches and brakes shown in U.S. Pat. No. 3,267,769.

The apply passage 50 is connected with an overlap valve 58 and a check valve 60. The overlap valve 58 has a valve spool 62 having four lands 64, 66, 68 and 70 which are progressively decreasing in diameter and are slidably disposed in a step bore 72. A bias spring 74 is disposed between valve land 64 and one end of valve bore 72 to urge the valve spool 62 to the position shown. In the position shown the space between lands 64 and 66 is in fluid communication with a brake passage 76 and an exhaust passage 78. The space between lands 66 and 68 is in fluid communication with the exhaust passage 78 and space between lands 68 and 70 is in fluid communication with the apply passage 50. Also in the position shown, the valve land 64 blocks a passage 80 which is connected between the check valve 60 and the overlap valve 58, and the ends of valve spool 62 are in fluid communication with the apply passage 52. The check valve 60 has a stem 82 secured in a valve body 84, a seat 86 slidably disposed on the stem 82 and a bias spring 88 urging the seat 86 to the position shown to prevent fluid communication between apply passage 50 and passage 80.

The passage 76 is in fluid communication with a chamber 90 of a fluid motor generally designated 92 which is part of a fluid operated friction drive establishing device 94 adapted to control a ring gear 96. The fluid motor 92 includes a piston 98 slidably disposed in a cylinder 100. The piston 98 is adapted to engage a plurality of friction plates 102 and 104 which are alternately connected between the ring gear 96 and a portion of the transmission housing 106 such that when the piston 98 is actuated by fluid pressure in chamber 90 the friction drive establishing device 94 is engaged to prevent rotation of the ring gear 96. A spring 108 disengages the piston 98 from the plates 102 and 104 when the chamber 90 is not pressurized.

The apply passage 52 is in fluid communication with a trimmer valve 110 and a chamber 112 of a fluid motor generally designated 114. The trimmer valve 110 includes a piston 116 and a plug 118 slidably disposed in a bore 120. A spring 122 is compressed between the piston 116 and the plug 118 and a pair of springs 124 and 126 are compressed between one end of bore 120 and the plug 118 to urge the plug 118 and the piston 116 to the position shown. The piston 116 has a restricted passage 128 which permits fluid pressure in passage 52 to slowly enter the space between piston 116 and plug 118 when apply passage 52 is pressurized. The bore 120 is in fluid communication with an exhaust passage 130. When apply passage 52 is initially pressurized the piston 116 and plug 118 will move against the springs 124 and 126 until exhaust passage 130 is opened to regulate the lower pressure limit in apply passage 52. The fluid in passage 52 will flow through restriction 128 to cause a slow pressure buildup between piston 116 and plug 118 thereby causing the plug and piston to separate and permit a further increase of pressure in passage 52 due to the increased bias on piston 116. The pressure in passage 52 will continue to increase until the plug 118 abuts a stop member 132 and the pressure between plug 118 and piston 116 is equal to the pressure in passage 52 which at that time will be equal to the pressure in the main passage 16.

The motor 114 includes a piston 134 slidably disposed in a cylinder 136. The motor 114 forms part of a fluid-operated friction drive establishing device generally designated 138 which device includes a plurality of friction plates 140 and 142 alternately splined between a portion of the transmission housing and a ring gear 144 to control the operation of the ring gear 144. As pressure develops in passage 52 the piston 134 is moved into engagement with the friction plates 140 and 142 to engage the friction device 138 thereby preventing rotation of the ring gear 144 to establish a drive ratio in the transmission. A return spring 146 is compressed between the transmission housing and the piston 134 in a manner similar to spring 108 such that when there is no pressure in chamber 112 the piston 134 will be disengaged from the friction plates 140 and 142 and the ring gear 144 will be free. The devices 94 and 138 are equivalent to the first and second drive establishing devices in U.S. Pat. No. 3,267,769.

The manual valve 18 is shown in the neutral position so that the fluid pressure in passage 16 is not delivered to any of the transmission friction devices. When the manual valve 18 is moved to the first drive position fluid pressure in passage 16 is directed to the engage passage 50 through the openings 26, passage 24 and opening 40. The fluid pressure in passage 50 acts on the differential area between lands 68 and 70 to cause the valve spool 62 to move to the left against spring 74. The fluid in passage 50 is also directed through check valve 60 to passage 80 which in the first instance is blocked by land 64. However, as the valve spool 62 is shifted against the spring 74, the passage 80 is opened to passage 76 to engage the friction device 94 and thereby establish a drive ratio in the transmission. Also, as the valve spool 62 is shifted the land 66 closes exhaust passage 78 between lands 64 and 66. The pressure in passage 76 acts on the differential area between lands 64 and 66 in the same direction as the pressure bias on the differential area between lands 68 and 70 to hold the valve spool 62 in the shifted position.

When the manual valve 18 is moved to the second ratio position the engage passage 50 is exhausted through passage 54 and the engage passage 52 is connected to main passage 16 through openings 26, passage 24 and opening 42. As the passage 50 is exhausted the check valve 60 will close thereby trapping the fluid in passage 76 and 80 to maintain a pressure bias on the differential area between lands 64 and 66. This pressure bias maintains the valve spool 62 in the shifted position. As explained above, the pressure rise in passage 52 is controlled by the trimmer valve 110 such that when the manual valve is initially shifted the pressure in passage 52 and therefore on the ends of valve spool 62 and in fluid motor 114 is initially low. The pressure in passage 52 acting on the differential area between valve lands 64 and 70 and the force of spring 74 is not sufficient to overcome the pressure bias on the differential area between lands 64 and 66. However, as the fluid pressure in passage 52 increases through the trimmer action, the pressure acting on the differential area between lands 64 and 70 will increase until that pressure is sufficient to assist the spring 74 in overcoming the differential area pressure bias. The pressure in the passage 76 is subject to leakage in the fluid motor 92 and therefore begins to decrease and the passage 50 is exhausted and the valve 60 closes. To provide a control leakage rate a passage such as 148 may be machined in valve land 66. When the pressure in passage 52 is sufficient to engage the friction device 114 the valve 62 will shift to the spring set position shown thereby exhausting the fluid motor 92 and the differential area pressure bias between lands 64 and 66 to disengage the friction device 94. Thus during the shift period power flows from the input to the output of the transmission uninterrupted since at least one friction device is always engaged during the upshift period. On a downshift from second to first the engage passage 52 is exhausted through passage 56 and the engage passage 50 is pressurized which will cause the overlap valve 58 to move to its shifted position as described above. There is no friction device overlap on the downshift. However, this is not critical during a downshift since vehicle stalling is not likely to occur during such a maneuver.

Many modifications and variations of the above-described control will be obvious to those skilled in the art in light of the above teachings. It is therefore to be understood that within the scope of the appended claims the invention may be practiced otherwise than is specifically described.

What is claimed is:

1. In a transmission and control a pair of friction drive establishing means selectively engageable for controlling a pair of drive ratios in said transmission, fluid source means, a manual control valve in communication with said source means and being moveable for selecting a plurality of drive ratios, and overlap control valve means including first differential area means connected intermediate said manual valve and one of said friction means and second differential area means connected in parallel with said manual valve and said other friction means for directing fluid pressure through said first differential area means to said one friction means when said manual valve is in one position and the pressure in said first differential area means being operable to maintain said one friction means engaged when said manual valve is moved to another position to engage said other friction means until said other friction means is sufficiently engaged to establish a drive ratio.

2. In a transmission and control a pair of friction drive establishing means selectively engageable for controlling a pair of drive ratios in said transmission; fluid source means; a manual control valve in communication with said source means and being moveable for selecting a plurality of drive ratios; and overlap valve means moveable to shifted and unshifted positions for controlling the engagement of one of said friction means including spring means for biasing said overlap valve means to said unshifted position, first differential area means in fluid communication with said manual valve being operable in response to fluid pressure therefrom to move said overlap valve means to said shifted position when said manual valve is in one position, second differential area means connected intermediate said manual valve and one of said friction means and being responsive to pressure in said one friction means to initially maintain said overlap valve in said shifted position when said manual valve is moved to another position and third differential area means connected in parallel with said manual valve and said other friction means; said third differential area means being responsive to fluid pressure in said other friction means to move said overlap valve to the unshifted position when said manual valve is moved to another position to engage said other friction means when said other friction means is sufficiently engaged to establish a drive ratio.

* * * * *